United States Patent
Linck et al.

(10) Patent No.: US 10,448,660 B2
(45) Date of Patent: *Oct. 22, 2019

(54) METERING THE DISPOSITION OF A FOOD PRODUCT INTO CAVITIES FORMING A PELLET

(75) Inventors: Karl L. Linck, Kohler, WI (US); Chay Vue, Sheboygan, WI (US); Craig Hackl, Fond du Lac, WI (US)

(73) Assignee: Kerry Luxembourg S.à.r.l., Luxembourg (LU)

( * ) Notice: Subject to any disclaimer, the term of this patent is extended or adjusted under 35 U.S.C. 154(b) by 101 days.

This patent is subject to a terminal disclaimer.

(21) Appl. No.: 13/614,868

(22) Filed: Sep. 13, 2012

(65) Prior Publication Data
US 2013/0084373 A1    Apr. 4, 2013

Related U.S. Application Data

(63) Continuation-in-part of application No. 13/251,722, filed on Oct. 3, 2011, now abandoned.

(51) Int. Cl.
*A23L 3/36* (2006.01)
*A23G 9/22* (2006.01)
(Continued)

(52) U.S. Cl.
CPC .............. *A23L 3/362* (2013.01); *A23G 9/083* (2013.01); *A23G 9/18* (2013.01); *A23G 9/221* (2013.01);
(Continued)

(58) Field of Classification Search
CPC . A23G 9/06; A23G 9/18; A23G 9/282; A23G 9/48; A23G 9/221; A23G 9/083;
(Continued)

(56) References Cited

U.S. PATENT DOCUMENTS 191,504 A * 5/1877 Woodward
1,998,431 A * 4/1935 Birdseye ........................... 62/60
(Continued)

FOREIGN PATENT DOCUMENTS

JP    2004132654 A    4/2004

OTHER PUBLICATIONS

Communication dated Jan. 14, 2016, issued by the U.S. Patent and Trademark Office in U.S. Appl. No. 13/614,986.
(Continued)

*Primary Examiner* — Drew E Becker
(74) *Attorney, Agent, or Firm* — Sughrue Mion, PLLC

(57) ABSTRACT

A process for metering the disposition of a food product into cavities forming a pellet. The cavities are defined in a conveyor as individual cavities. Each cavity defines a specific volume. The process includes supplying a quantity of food product in a supply chamber which includes a plurality of nozzles aligned above the conveyor. The nozzles are aligned with a predetermined portion of the cavities. A predefined supply of food product is dispensed and metered through each nozzle. The food product is dispensed through the nozzles into the cavities without exceeding the specific volume of the cavity. The food product is frozen into an individual quick frozen pellet starting immediately upon disposition in one of the cavities. The step of metering the predefined amount of food product includes metering a predetermined weight of the food product.

17 Claims, 5 Drawing Sheets

(51) Int. Cl.
  *A23G 9/28* (2006.01)
  *A23G 9/48* (2006.01)
  *A23G 9/18* (2006.01)
  *A23G 9/08* (2006.01)
  *F25D 25/04* (2006.01)
  *A23P 30/10* (2016.01)
  *A23L 23/00* (2016.01)
  *A23L 23/10* (2016.01)
  *F25D 3/11* (2006.01)

(52) U.S. Cl.
  CPC ............... *A23G 9/28* (2013.01); *A23G 9/48* (2013.01); *A23L 23/00* (2016.08); *A23L 23/10* (2016.08); *A23P 30/10* (2016.08); *F25D 3/11* (2013.01); *F25D 25/04* (2013.01)

(58) Field of Classification Search
  CPC ...... A23L 1/0079; A23L 1/0073; A23L 3/361; A23L 3/362; A23L 23/00–23/10; A23P 1/105; A23P 1/086; A23P 1/125; A23P 30/10; F25D 25/04; F25D 3/11
  USPC ........ 426/512–513, 515, 516, 524; 62/1, 66, 62/74, 345, 347, 348, 356; 425/140, 148, 425/439–443
  See application file for complete search history.

(56) References Cited

U.S. PATENT DOCUMENTS

| | | | |
|---|---|---|---|
| 2,021,047 A | 11/1935 | Chilton | |
| 2,347,083 A * | 4/1944 | Connellee | A23G 9/282 426/249 |
| 2,365,349 A | 12/1944 | MacManus | |
| 2,569,231 A * | 9/1951 | Danhof | B28B 5/025 264/228 |
| 2,582,074 A * | 1/1952 | Sebring | 425/441 |
| 2,664,592 A * | 1/1954 | Ingraham et al. | 425/447 |
| 2,751,687 A | 6/1956 | Colton | |
| 2,850,051 A * | 9/1958 | Rasmusson | 141/160 |
| 2,866,420 A * | 12/1958 | Nutty | 426/249 |
| 2,949,639 A | 8/1960 | Woodward | |
| 2,952,054 A * | 9/1960 | Katzman | B22D 5/04 164/330 |
| 2,983,983 A * | 5/1961 | Mayer | B28B 5/025 249/129 |
| 3,285,029 A | 11/1966 | Pansing | |
| 3,402,568 A | 9/1968 | Kamin et al. | |
| 3,477,393 A * | 11/1969 | Bell et al. | 425/131.1 |
| 3,685,313 A * | 8/1972 | Rhodes | A21B 3/18 425/436 R |
| 3,771,322 A | 11/1973 | Betschart | |
| 3,809,774 A * | 5/1974 | Raitt | 426/393 |
| 3,860,057 A | 1/1975 | Garlick | |
| 3,976,120 A * | 8/1976 | Raab | B22D 5/04 164/330 |
| 4,044,161 A | 8/1977 | Tanara | |
| 4,068,993 A | 1/1978 | Dacey et al. | |
| 4,088,249 A | 5/1978 | Westling | |
| 4,111,272 A * | 9/1978 | Ricciardi et al. | 177/50 |
| 4,315,885 A | 2/1982 | Lemelson | |
| 4,335,583 A * | 6/1982 | Billett | 62/345 |
| 4,418,085 A | 11/1983 | Bicquelet | |
| 4,507,326 A * | 3/1985 | Tarantino | 426/101 |
| 4,530,214 A * | 7/1985 | Ellsworth et al. | 62/71 |
| 4,548,573 A * | 10/1985 | Waldstrom | A23G 9/04 425/126.2 |
| 2,865,310 A | 12/1985 | Murray | |
| 4,714,419 A | 12/1987 | Nielsen | |
| 4,715,275 A | 12/1987 | Getman | |
| 4,832,970 A | 5/1989 | Mally et al. | |
| 5,073,379 A | 12/1991 | Klimesch et al. | |
| 5,199,269 A * | 4/1993 | Andersson | 62/63 |
| 5,208,059 A * | 5/1993 | Dubowik et al. | 426/512 |
| 5,242,291 A * | 9/1993 | Farmakis | A23G 1/21 425/215 |
| 5,279,842 A | 1/1994 | Escola Gallart et al. | |
| 5,394,707 A * | 3/1995 | Miller et al. | 62/345 |
| 5,458,055 A | 10/1995 | Fitch, Jr. | |
| 5,520,013 A | 5/1996 | Kuo | |
| 5,733,587 A | 3/1998 | Ream et al. | |
| 5,756,131 A * | 5/1998 | Suh | B28B 5/025 164/430 |
| 6,012,293 A * | 1/2000 | Andersson | 62/72 |
| 6,025,003 A * | 2/2000 | Jadraque | A23G 9/06 426/515 |
| 6,216,472 B1 * | 4/2001 | Cathenaut | A23G 9/14 425/126.2 |
| 6,251,447 B1 * | 6/2001 | Olofsson | A23L 3/365 426/100 |
| 6,355,288 B1 | 3/2002 | DiGiacomo | |
| 6,408,639 B1 * | 6/2002 | Jagaeus | B65G 17/067 62/345 |
| 6,534,106 B2 * | 3/2003 | Cathenaut | A23G 9/281 426/317 |
| 6,565,902 B2 * | 5/2003 | Ruano Del Campo | A23G 9/44 425/126.2 |
| RE38,478 E | 3/2004 | Fitch, Jr. et al. | |
| 7,040,974 B2 | 5/2006 | Shefet | |
| 7,182,683 B2 | 2/2007 | Shefet | |
| 7,658,958 B2 * | 2/2010 | Hansen | 426/279 |
| 7,814,754 B2 * | 10/2010 | Hermansen | 62/66 |
| 7,819,053 B2 | 10/2010 | Kaiser et al. | |
| 7,820,218 B2 | 10/2010 | Suttle et al. | |
| 7,955,066 B2 | 6/2011 | Takeuchi | |
| 8,083,976 B2 | 12/2011 | Lengsfeld et al. | |
| 8,409,650 B2 | 4/2013 | Pasini Bertran | |
| 9,648,898 B2 * | 5/2017 | Strand | A23P 30/10 |
| 2002/0152764 A1 | 10/2002 | Berghoff et al. | |
| 2003/0131624 A1 * | 7/2003 | Rasmussen et al. | 62/345 |
| 2005/0161855 A1 | 7/2005 | Brown et al. | |
| 2006/0051475 A1 * | 3/2006 | Fornaguera et al. | 426/516 |
| 2009/0061059 A1 * | 3/2009 | Jarvis et al. | 426/515 |
| 2009/0120107 A1 * | 5/2009 | Oztas | A23L 3/36 62/63 |
| 2010/0139293 A1 | 6/2010 | Maccise Sade et al. | |
| 2010/0303979 A1 | 12/2010 | Massa et al. | |

OTHER PUBLICATIONS

Communication dated Sep. 25, 2015, issued by the U.S. Patent and Trademark Office in U.S. Appl. No. 13/614,986.
Communication dated Jan. 22, 2014, issued by the U.S. Patent and Trademark Office in U.S. Appl. No. 13/251,722.
Communication dated Nov. 4, 2013, issued by the U.S. Patent and Trademark Office in U.S. Appl. No. 13/251,722.
Communication dated Aug. 5, 2013, issued by the U.S. Patent and Trademark Office in U.S. Appl. No. 13/251,722.
Communication dated May 30, 2013, issued by the U.S. Patent and Trademark Office in U.S. Appl. No. 13/251,722.

* cited by examiner

METERING THE DISPOSITION OF A FOOD PRODUCT INTO CAVITIES FORMING A PELLET

CROSS-REFERENCE TO RELATED PATENT APPLICATIONS

This patent application is a continuation-in-part of U.S. patent application Ser. No. 13/251,722, filed on Oct. 3, 2011, now abandoned, entitled "Metering the Disposition of a Food Product into Cavities Forming a Pellet," which patent application is assigned to the assignee of the present invention, and which patent application is hereby incorporated herein by reference in its entirety.

BACKGROUND OF THE INVENTION

Field Of The Invention

The present invention generally relates to the process for making individual quick frozen pellets composed of a food product. More specifically, the invention relates to providing a portion control fill of cavities in a mold to a specific desired weight and quick freezing each individual food product in the cavity into a pellet.

It is known that various styles of freezing apparatus exists for the creation of sauce pieces frozen from a liquid form. The sauces typically are composed of cheese, vegetables, and various meats in a consistency for food disposition. Some of the freezing apparatus utilize a flat belt onto which specific amounts of sauce are deposited and frozen. Other apparatus use a series of plates or trays that define molded cavities into which a fluid product is filled. Still further apparatus include a conveyor that itself defines cavities into which the liquid sauce is deposited and frozen.

In a typical operation, the liquid food product is in a open-ended box that sits above a conveyor containing the molds and allows the liquid product to flow into the molds by gravity. The edges of the box then scrape off most of the excess food product with a controlled amount of flash existing between individual frozen pieces. Such flash constitutes waste and such wasted food product may or may not be reusable depending on the particular apparatus and process involved. The cavities filled with the food product is then frozen either in a cryogenic process or more typically in a refrigeration tunnel associated with the filling apparatus.

The process and system of the present invention must also be of construction which is both durable and long lasting, and it should also require little or no maintenance to be provided by the user throughout its operating lifetime. In order to enhance the market appeal of this disclosure, the system should also be of inexpensive construction to thereby afford it the broadest possible market. Finally, it is also desirable that all of the aforesaid advantages be achieved without incurring any substantial relative disadvantage.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present disclosure.

There is provided a process for metering the disposition of a food product into cavities for forming a pellet. The cavities are defined in an endless conveyor as individual cavities. Each cavity defines a specific volume. The process includes supplying a quantity of food product in a supply chamber with the supply chamber including a plurality of nozzles aligned above the conveyor. The temperature of the conveyor is reduced to a predetermined temperature in a cryogenically refrigeration apparatus. The plurality of nozzles are aligned with a predetermined portion of the cavities.

A predefined amount of the supply of food product dispensed and metered through each nozzle. The food product is dispensed through one of the nozzles into one of the cavities without exceeding the specific volume of the cavity. The food product is frozen into an individual quick frozen pellet starting immediately upon disposition in one of the cavities. The step of metering the predefined amount of food product includes metering to include a predetermined weight of the food product.

In another embodiment, the process for metering the disposition of the food product includes supplying a second quantity of food product in a second supply chamber having a second plurality of nozzles. The second plurality of nozzles are aligned with the predetermined portion of cavities with the second predefined amount of food product metered and dispensed through each of the second plurality of nozzles into the predetermined portion of the cavities on top of the previously dispensed food product.

It is further provided a system to meter the disposition of the food product into an individual quick frozen pellet. The system includes an endless conveyor, with the conveyor including cavities, with each cavity defining a specific volume. A quick freeze apparatus is coupled to the conveyor and configured to freeze material defining the cavities as the conveyor moves through the apparatus. The cavities can be defined in a tray which is supported by and moved by the conveyor, or the cavities can be defined in the conveyor itself. The system further includes a supply chamber configured to hold a supply of the food product. The supply chamber includes a plurality of nozzles positioned above the conveyor and aligned with a predetermined portion of the cavities. The nozzles are configured to dispense the food product into the predetermined portion of the cavities without exceeding the individual, specific volume of such cavities and the dispensed food product is frozen starting immediately upon disposition in the cavities.

In another embodiment, the system to meter the disposition of the food product into individual quick frozen pellets further includes a second quantity of food product in a second supply chamber. The second supply chamber is in communication with the plurality of nozzles, aligned above the conveyor with the plurality of nozzles configured to dispense both quantities of food product simultaneously through the same plurality of nozzles into the predetermined portion of cavities.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
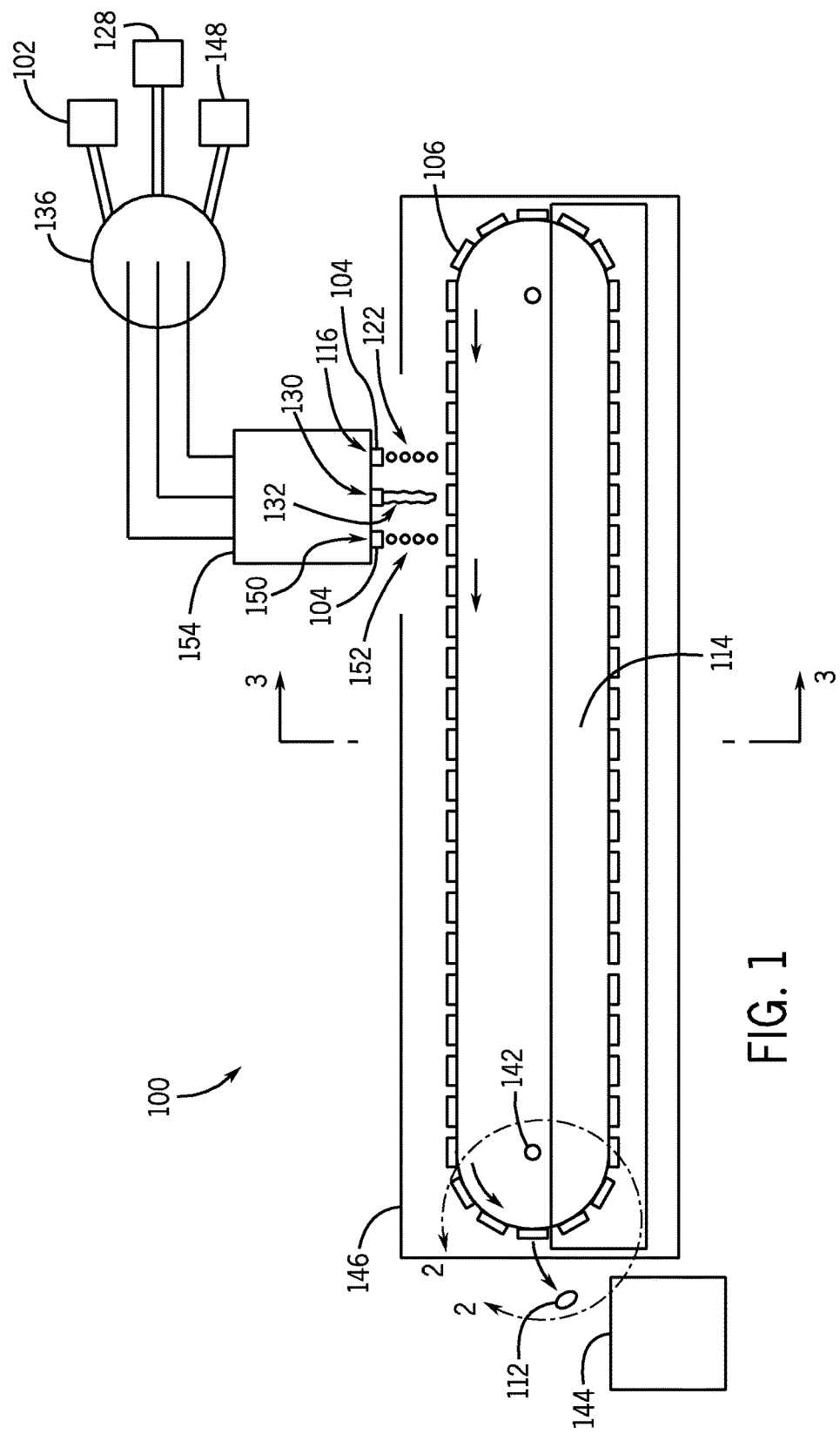
FIG. 1 is a schematic side illustration of a system to meter the disposition of a food product into an endless conveyor creating individual quick frozen pellets.
Figure 2:
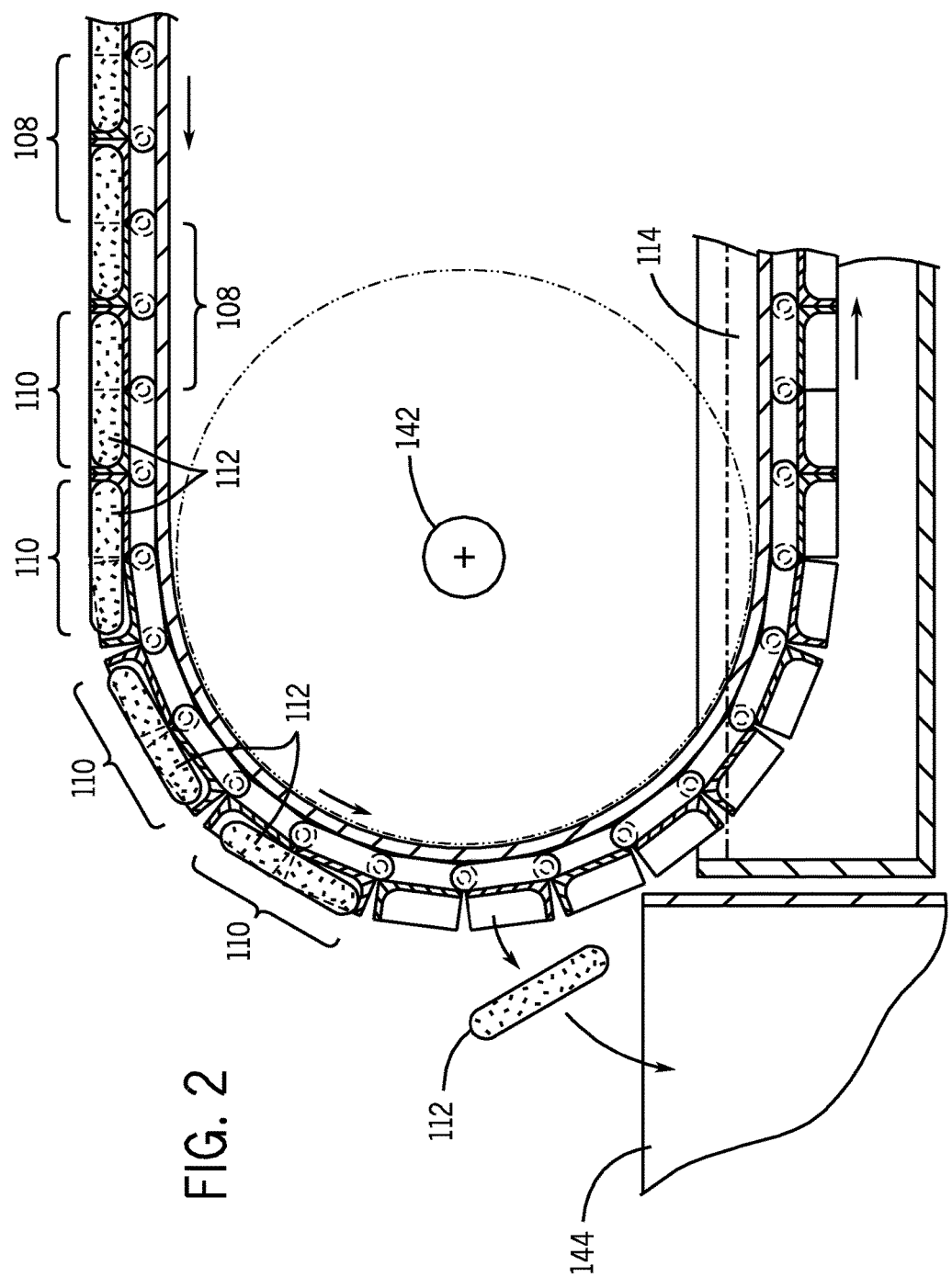
FIG. 2 is a partial, section view of a portion of the endless conveyor of the system illustrated in FIG. 1, illustrating ejection of a pellet from a cavity as the cavity sections separate.

There is disclosed a processing system for metering the disposition of a food product into cavities for forming an individual quick frozen pellet. The process and system provides a portion controlled fill to cavities 110 moving on a conveyor 106 underneath a plurality of nozzles 104, with the nozzles coupled to at least one food product supply chamber 102. The schematic of the system illustrated in FIG. 1 for the system for metering the disposition of food product 100 illustrates a food product supply chamber 102 which includes a plurality of nozzles 104. Each nozzle is in communication with the supply chamber 102 and it is through each nozzle that the portion control of food product is deposited into a predetermined portion of cavities 120 of a corresponding plurality of cavities 110.

Figure 3:
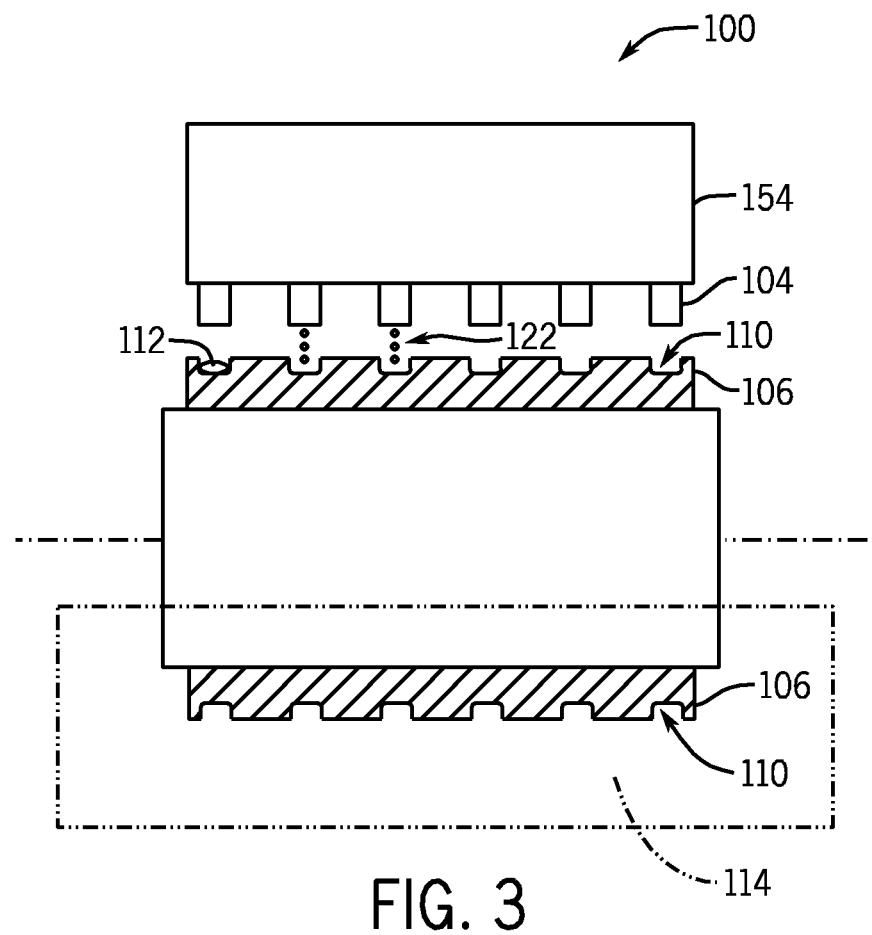
FIG. 3 is a schematic section view of the system illustrated in FIG. 1 along the line 3-3.
Figure 4:
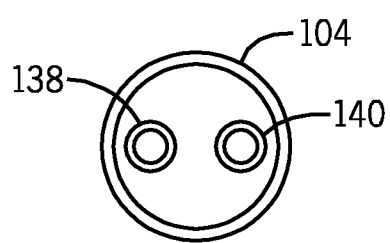
FIG. 4 is an end view of a nozzle configured with two discharge chambers aligned side-by-side.

The cavities 110 are defined in the conveyor 106 belt itself (FIGS. 3 and 4). The material defining the cavity is typically composed of metal such as stainless steel and in some instances is a two-part structure with a pivot or hinge aligned along a flexline 111 that allows a pellet 112 contained in the cavity 110 to be removed from the cavity 110 at a dispensing station by flexing the conveyor as the conveyor moves around a pivot 142.

Figure 6:
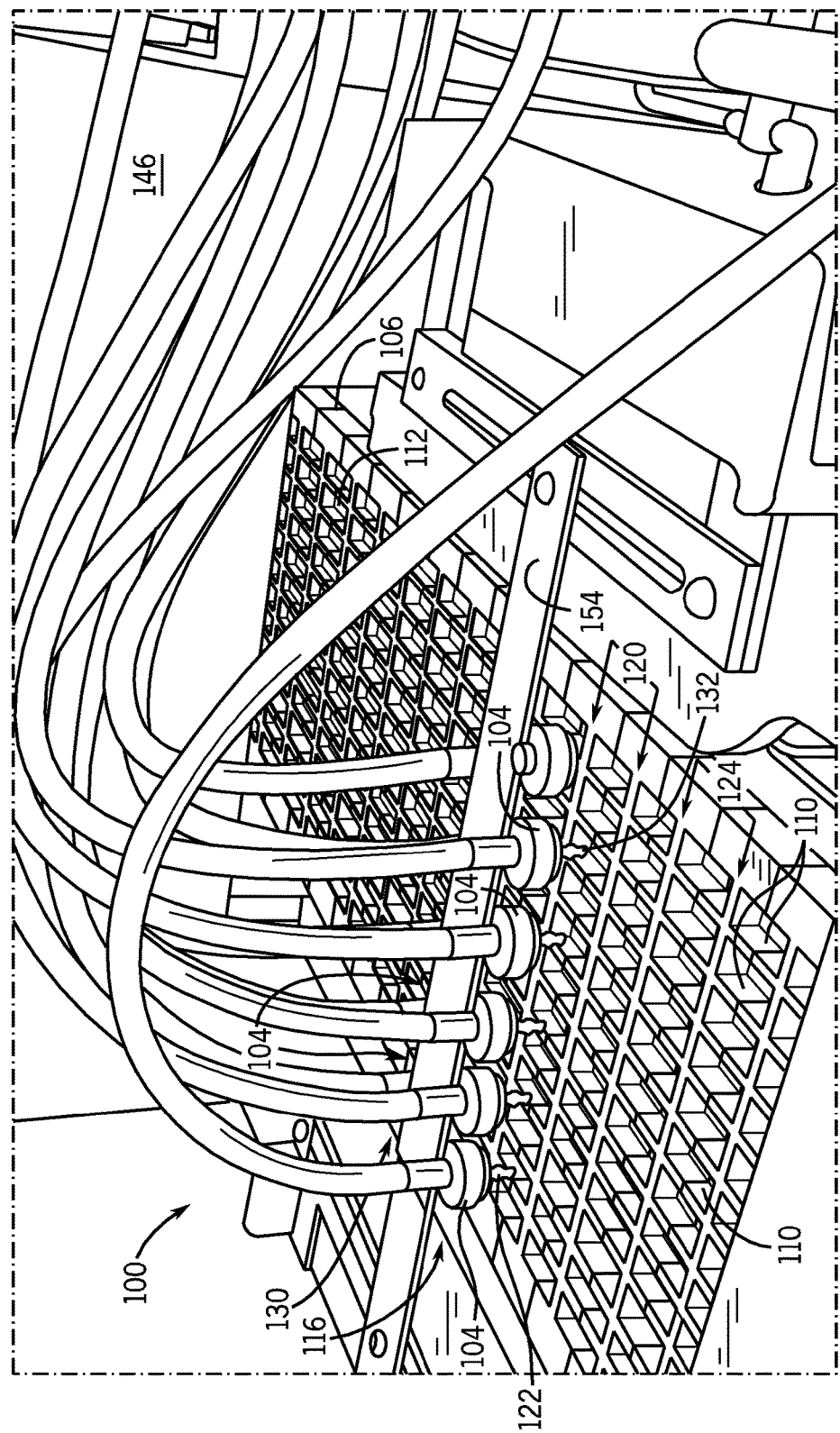
FIG. 6 is a perspective view of a portion of the system illustrated in FIG. 1.
Figure 7:
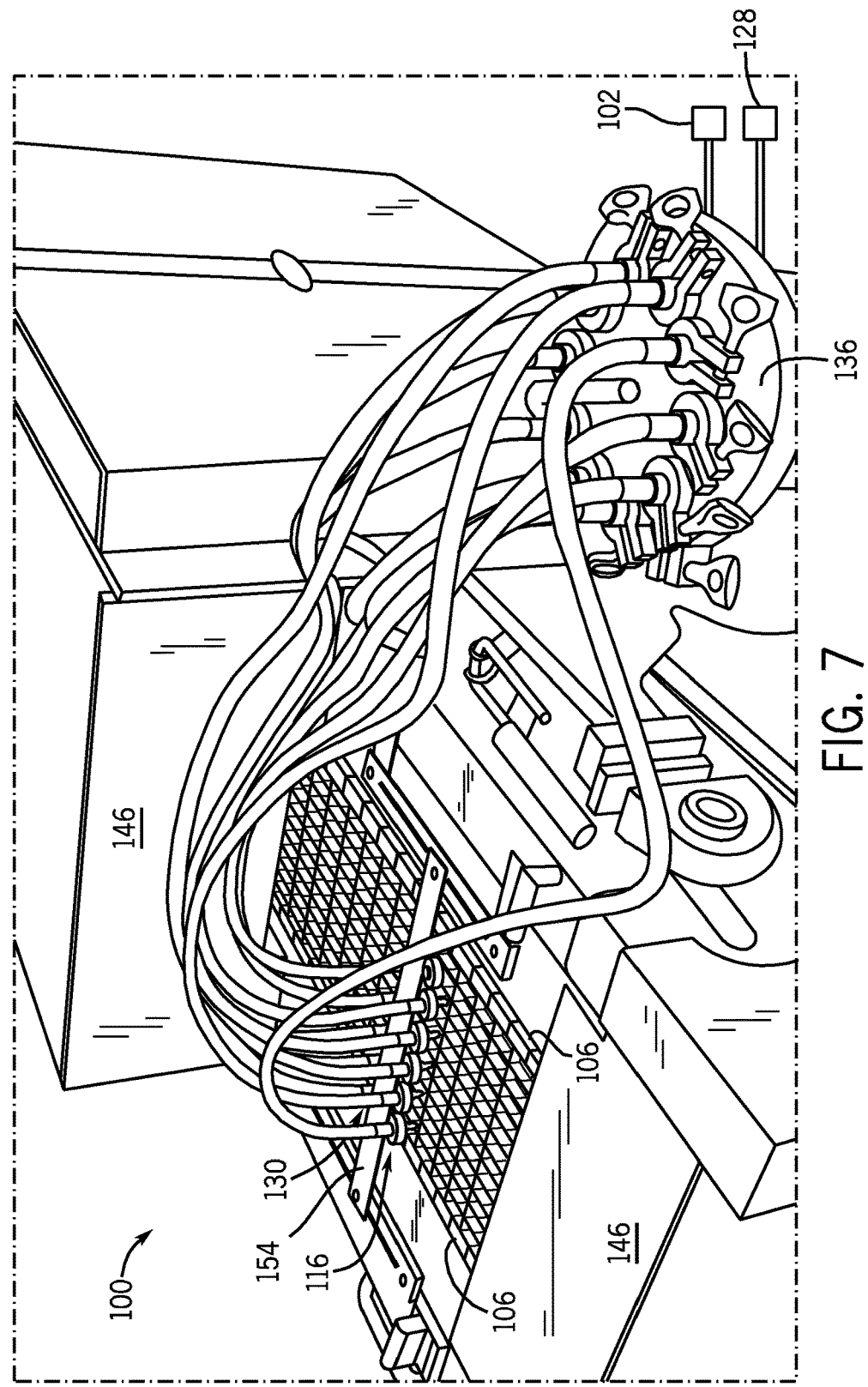
FIG. 7 is a perspective view of a portion of the system illustrated in FIG. 6 including a distribution manifold and two food supply chambers.

The system 100 includes a housing 146 which is configured to enclose the conveyor 106 and quick freeze apparatus 114. The figures do not show complete enclosure so that certain features of the system 100 can be illustrated. FIGS. 1 and 6 illustrate two embodiments of the nozzle support structure 154. In each embodiment the plurality of nozzles 116, 130, and 150 are configured to extend traversely over the cavities 110 of the conveyor 106. At least one nozzle 104 is positioned over each cavity 110 in the conveyor 106. As explained below, a nozzle 104 may have multiple discharge chambers 138, 140.

In other embodiments the system 100 will have a plurality of nozzles aligned serially (See FIG. 1) to deposit a food product in a select cavity in sequence. For example, in FIG. 1, the first plurality of nozzles 116 deposits a solid food product, a predetermined amount of food 122, the second plurality of nozzles 130 deposits a second predetermined amount of food 132 (a viscous food product) into the same cavity as the conveyor 106 moves, the conveyor continues to move and a third plurality of nozzles 150 deposits a solid food product, a predetermined amount of food 152 into the same cavity, which creates the pellet 112. It should be understood that the type of food product deposited can vary as determined by the user or operator of the system 100.

The nozzles 110 do not touch the cavity walls or other parts of the conveyor 106. In contrast to the prior art (See U.S. Pat. No. 6,408,639) which scrapes across the conveyor 6 and creates flash on the conveyor 6, the present disclosure does not create flash and controls the amount of food product deposited in each cavity 110 by weight and volume to eliminate waste. It should be understood that any combination of nozzles 104 can be configured for a given system, for example, only one food product can be deposited in all of the cavities. In another example, two different types of food product, solid and viscous, can be deposited in the same cavity, either from the same nozzle (See FIGS. 4 and 5) or from different serial nozzles.

The removal of the pellet 112 from the cavity 110 typically occurs at the end of the fill conveyor line and deposited in a bin or onto another conveyor system for further processing, for example packaging.

The filling of the cavities 110 of the food product 122, 132, and 152 occurs in such a manner that the food product is only filled to the molds without having any product deposited outside of the mold cavities or between the mold cavities as flash. With the present disclosure, there is no need for the food product supply chamber 102 or scrape apparatus to swipe across the conveyor as is typically required in the prior art. It should be understood that a pellet 112 can be configured in any desired shape which is controlled by the shape of the cavity 110 into which the food product is deposited and the amount of food product deposited.

With the present process and system, the filling of a mold or the mold cavity 110 with food product 122, 132, 152 can create exact weight pieces in each of the cavities 110 of the mold. Such arrangement is desirable for a product which may be dispensed by count at the end use, for example the packaging process, with a specific combined weight of the food product. For example if the end product was to contain a one pound package of a specific type of food product pellet 112, with the present process and system, 16 cavities can be filled with 16 1-oz. disposition of food products from the food supply chamber 102 into each cavity 110 creating a pellet 112. Such pellets typically are quick frozen such that at the end of the filling conveyor the cavities are emptied of the 16 pellets and the 16 pellets can be further processed, for example additional freezing, or packaged into the desired 1 lb. package, for example a bag. Since there would be no flash associated with this process and system, the conveyor 106 defining the cavities 110 would be in a condition for immediate continued use after reducing the conveyor temperature to a predetermined temperature since no flash or overfill would have to be cleaned or removed.

The present process and system also provides the ability to deposit different predetermined weight of food products in a predetermined portion of cavities 120, 124 in the conveyor. The different weight of the food product pellet 112 in the different portion of cavities, can be separated at the end of the fill conveyor line to provide flexibility in creating end user packaging with the different weighted pellets. Such purposeful difference in weight creates a statistically significant difference to allow a computerized combination or weighing scale the ability to better make exact dispensing weights of the frozen pellets into subsequent packages or meal kits of the specific food product.

In another embodiment, the process and system provides that a second quantity of food product 132 in a second supply chamber 128 having a second plurality of nozzles 130 are aligned over the conveyor containing the cavities. The second plurality of nozzles 130 are aligned with the predetermined portion of cavities 124 metering the second predetermined amount of food product 122 and dispensing the second quantity of food product through each of the second plurality of nozzles into the predetermined portion of cavities on top of the previously dispensed food product. In this embodiment, using more than one filler to provide a sequential style of fill allows multiple liquid ingredients to be layered into a final individual quick frozen pellet 112.

It is also contemplated, with the above-described embodiment, that the dispensing of a solid food product, for example a small carrot cube into a cavity prior to the liquid sauce in the second supply 128 chamber and nozzle system deposits the sauce into the same cavity as the carrot piece. Such arrangement encapsulates the carrot piece or pieces into a single pellet. It is also possible, with this embodiment, that the fluid sauce is deposited in the cavity first and then the solid piece of food product from the second supply chamber 128 is deposited on top of the first deposited food product. It is also understood that a third plurality of nozzles 150 dispensing a food product 152 from a third supply chamber 148 can be configured in the system 100

The present system 100 provides for a quick freeze apparatus 114 coupled to the endless conveyor 106 defining the plurality of cavities 110. This system, cryogenically refrigerates the conveyor belt 106 with, for example, liquid nitrogen (which has a temperature between −196° C. and −210° C.), such that when the food product is deposited into the cavity the freezing of the food product into an individual quick frozen pellet starts immediately upon disposition in the cavities 110. In one embodiment, a portion of the endless conveyor 106 moves through the quick freeze apparatus 114 (See FIG. 1) for a time period sufficient to reduce the temperature of the conveyor 106 to a very low temperature (perhaps −150° C.).

It should be understood that a final hard freeze may not occur to the entire pellet until it is discharged from the pellet portion of the freezer and then goes through a more traditional belt freezer to get the core fully frozen. However, edge freezing of the food product, that portion of the food product in immediate contact with the material defining the cavity, occurs on contact of the food product with the edge of the cavity. This freezing progresses towards the core of the pellet, while other freezing occurs to the top of the pellet due to liquid nitrogen being introduced to the top of the pellet in some configurations. Conduction on the sides of the cavity also tends to freeze the food product upon disposition of the food product into a cavity.

Figure 5:
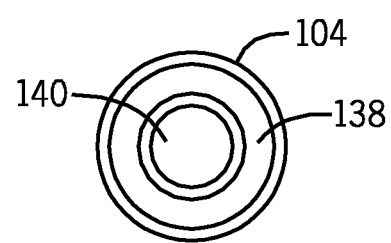
FIG. 5 is an end view of a nozzle configured with two discharge chambers aligned concentrically.

In another embodiment, each of the nozzles 104 includes at least two separate discharge chambers 138, 140 with each chamber in communication with one of a quantity of food products 102, 128. In one configuration, the two discharge chambers 138, 140 are aligned side by side (FIG. 4) and in another configuration the two discharge chambers are aligned concentrically (FIG. 5). Such nozzles are configured to dispense the two quantities of food product simultaneously through the same plurality of nozzles into the predetermined portion of cavities on or in the conveyor 106. Such simultaneous discharge of the food products into the same cavity provides a marbling effect. A distribution manifold 136 is coupled to the food supply chambers 102, 128, 148 and facilitates distribution to the predetermined nozzles for dispensing of the food product. Appropriate pumps, conduits, tubes and related equipment are coupled to the distribution manifold 136. An exemplary distribution manifold is illustrated in FIG. 3. The distribution manifold 136 can be any suitable and convenient mechanism configured to distribute the food product to the desired nozzles.

It should be understood that any number of supply chambers can be coupled to the manifold 136 and provide food product above a conveyor 106 in dispensing different food products into different portions of cavities 120, 124 moving underneath the nozzles. This allows an operator to fill different mold cavities with different combinations of food products within different molds as determined by the operator. The disposition of the food product through the plurality of nozzles 104 can be by gravity or under pressure, such as a spray liquid filler in combination with either a liquid filler or solid filler. A valve apparatus is associated with each nozzle to control the predetermined amount of food product disposed into a cavity.

It is also contemplated that the system and process can be controlled by a controller coupled to the system that controls the amount, weight, combination of food products being deposited in specific cavities or groups of cavities as determined by an operator.

It is contemplated, the process and system of the present disclosure provides that the quantity of food product can be one of a solid food product or a viscous food product. For example, the food product can be one of a cheese sauce, a vegetable sauce, and a meat sauce. For further example, an individual quick frozen pellet can be a homogenous pellet of each sauce to give a blend of marinara, parmesan, and a garlic sauce in a machine at the end of the filler conveyor.

The present process and system 100 for metering the disposition of the food product into cavities 110 to form a pellet 112 provides the ability to create exact weight pellets, create exactly random weight pellets to improve filling accuracy with a computerized combinational weighing scale. The process and system 100 also provides for the creation of pellets 112 with both viscous and nonviscous food products and to create food pellets with multiple liquid and solid ingredients.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present process and system has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations as described herein may be made, none of which depart from the spirit or scope of the present disclosure. The particular embodiments and applications were chosen and described to provide the best illustration and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A process for metering the disposition of a food product into cavities for forming a pellet, the cavities are defined in an endless conveyor as individual cavities, with each cavity having a volume and each cavity being defined by a two part structure that transitions between an unexpanded position and an expanded position along a curved path of the endless conveyor, wherein a bottom structure of the cavity comprises two bottom surfaces and in the expanded position the two bottom surfaces angle away from one another so as to press against and thereby physically eject the frozen food product from the cavity and in the unexpanded position the two bottom surfaces are aligned to form a continuous bottom surface of the cavity, the cavity in the unexpanded position defining the shape of the pellet;

wherein the two bottom surfaces for each cavity are coupled to a common hinge so as to rotate about an axis of the common hinge when transitioning between the unexpanded and expanded positions; the process comprising: supplying a quantity of food product in a supply chamber, wherein the supply chamber includes a plurality of nozzles that are aligned above the conveyor and that do not do not touch the conveyor or the cavity two part structure; reducing the temperature of the conveyor to a predetermined temperature in a cryogenic refrigeration apparatus prior to metering and dispensing the food product into the cavities; aligning the plurality of nozzles with a predetermined portion of the cavities; metering a predefined amount of the supply of food product dispensed through each nozzle; for each cavity, dispensing the food product through one of the nozzles into the cavity without exceeding the volume of the cavity so that the food product in each cavity is contained and separate from the food product in an adjacent cavity; freezing the food product into an individual quick frozen pellet starting immediately upon disposition in the cavity, and expanding the cavity to eject the quick frozen pellet from the cavity.

2. The process for metering the disposition of a food product of claim 1, further comprising the step of metering to include a predetermined weight of the food product.

3. The process for metering the disposition of a food product of claim 2, wherein each cavity of a predetermined portion of the cavities receives a different predetermined weight of the food product.

4. The process for metering the disposition of a food product of claim 1, further comprising supplying a second quantity of food product in a second supply chamber having a second plurality of nozzles, aligning the second plurality of nozzles with the predetermined portion of the cavities, metering the second predefined amount of food product, and dispensing the second quantity of food product through each of the second plurality of nozzles into the predetermined portion of cavities on top of the previously dispensed food product.

5. The process for metering the disposition of a food product of claim 1 wherein the quantity of food product is one of a solid food product and a viscous food product.

6. The process for metering the disposition of a food product of claim 4, wherein the second quantity of food product is one of a solid food product and a viscous food product.

7. The process for metering the disposition of a food product of claim 1, further comprising supplying a second quantity of food product in a second supply chamber in communication with the plurality of nozzles aligned above the conveyor with the plurality of nozzles configured to dispense both quantities of food product simultaneously through the same plurality of nozzles into the predetermined portion of cavities.

8. The process for metering the disposition of a food product of claim 7, wherein each nozzle of the plurality of nozzles comprises two separate discharge chambers with each chamber in communication with one of the quantity of food products.

9. The process for metering the disposition of a food product of claim 8, wherein the two discharge chambers are aligned side-by-side.

10. The process for metering the disposition of a food product of claim 8, wherein the two discharge chambers are aligned concentrically.

11. The process for metering the disposition of a food product of claim 1, further comprising supplying a second quantity of food product in a second supply chamber having a second plurality of nozzles, aligning the second plurality of nozzles with a second predetermined portion of the cavities, metering the second predefined amount of food product, and dispensing the second quantity of food product through each of the second plurality of nozzles into the second predetermined portion of cavities.

12. The process for metering the disposition of a food product of claim 1, wherein the food product is one of a cheese sauce, vegetable sauce, and a meat sauce.

13. The process for metering the disposition of a food product of claim 1, wherein the filling of the cavities of the food product occurs in such a manner that the food product is filled only to the cavities without having any product deposited outside of the cavities or between the cavities as flash.

14. The process for metering the disposition of a food product of claim 1, wherein a rotational axis of the hinge is parallel to a rotational axis of the curved path of the endless conveyor.

15. The process for metering the disposition of a food product of claim 1, wherein the cavity reaches a maximum expansion on the curved path of the endless conveyor to allow the pellet to be dropped from the cavity.

16. The process for metering the disposition of a food product of claim 7, wherein the simultaneous discharge of the food products into the same cavity provides a marbling effect in the cavity.

17. The process for metering the disposition of a food product of claim 1, wherein the conveyor has an upper path and a lower path that is below the upper path, and the conveyor moves through the cryogenic refrigeration apparatus during conveyance along the lower path.

* * * * *